United States Patent [19]
Yasumatsu

[11] Patent Number: 5,579,518
[45] Date of Patent: Nov. 26, 1996

[54] MESSAGE COMPILER FOR OBJECT-ORIENTED LANGUAGE THAT STATICALLY PRODUCES OBJECT CODE BY PROVISIONALLY IDENTIFYING A SET OF CANDIDATE TYPES

[75] Inventor: Kazuki Yasumatsu, Yokohama, Japan

[73] Assignee: Fuji Xerox Co., Ltd., Tokyo, Japan

[21] Appl. No.: 455,255

[22] Filed: May 31, 1995

Related U.S. Application Data

[63] Continuation of Ser. No. 208,514, Mar. 10, 1994, abandoned.

[30] Foreign Application Priority Data

Mar. 19, 1993 [JP] Japan ................................. 5-060614

[51] Int. Cl.⁶ .................................................. G06F 15/00
[52] U.S. Cl. .............. 395/705; 364/DIG. I; 364/DIG. II; 395/683; 395/685; 395/800
[58] Field of Search .................................. 395/600, 375, 395/700, 800

[56] References Cited

U.S. PATENT DOCUMENTS

| | | | |
|---|---|---|---|
| 5,159,687 | 10/1992 | Richburg ................................ | 395/700 |
| 5,297,279 | 3/1994 | Bannon et al. ......................... | 395/600 |
| 5,313,630 | 5/1994 | Namioka et al. ....................... | 395/600 |
| 5,335,345 | 8/1994 | Frieder et al. ......................... | 395/600 |
| 5,361,350 | 11/1994 | Conner et al. ......................... | 395/600 |

FOREIGN PATENT DOCUMENTS 2-231638  9/1990  Japan .

OTHER PUBLICATIONS

Distributed Object Interoperability via a Network Type system by, 1992 IEEE publication pp. 319–327.
Using OOP techniques instead of switch in C++. by Michael et al., C User Journal 1992 p. 105(7).
An Object Oriented Framework for Static and Dynamic Object Recognition, 1991 IEEE Publication 58–62.
Parallelizing Translator for an Object–Oriented Parallel Programming Language by Jo et al, 1991 IEEE pp. 265–271.
Object–Oriented Programming by D'Andrea et al., 1990 IEEE Publication, pp. 634–640.
Building an Object–Oriented Environment for Distributed Manufacturing Software by Sturzenbecker, IEEE, 1991, pp. 1972–1978.
Support for Maintaining Object–Oriented Programs by Lejter et al., 1992 IEEE, pp. 1045–1052.
"Object–Oriented Programming—An Evolutionary Approach", Japan 1988.

*Primary Examiner*—William M. Treat
*Assistant Examiner*—Zarni Maung
*Attorney, Agent, or Firm*—Oliff & Berridge

[57] ABSTRACT

A data processing system including a message compiler for an object-oriented language with which object types are determined during execution of a programming code. The compiler compiles source code into object code. The compiler includes a provisional type identifying device for provisionally identifying a set of candidate types for an object to which a message is to be transmitted, based on a parsed result of the source code. A static method-searching device statically searches a method corresponding to the candidate type provisionally identified by the provisional type identifying device when the set of candidate types includes at least one candidate type. A type-checking code producing device produces object code to perform a type-check with the set of candidate types provisionally identified, if the set of candidate types includes more than one candidate type. A static call producing device produces, based on the method statically searched by the static method-searching device, object code for a statically bound call. The static call producing device also produces object code for a statically bound call if a candidate type of the set of candidate types is type-checked to be of a correct type. A dynamic call producing device produces object code for a dynamically bound call, if the provisional type identifying device identifies an empty set of the candidate types and produces object code if the candidate type is type-checked to be of an incorrect type.

3 Claims, 8 Drawing Sheets

```
exampleMessage1
    [a]
    a : = Array new: 5.
    a at: 1 put; 20.
    ^a
```

FIG.3a

```
exampleMessage1:
    ⋮
    push    Array
    push    new:
    push    5
    call    lookup
    mov     result, a
    push    a
    push    at:put:
    push    1
    push    20
    call    lookup
    mov     a, result
    rts
```

FIG.3b

```
exampleMessage1:
    ⋮
    push    Array
    push    5
    call    ArrayClass.new:

mov     result, a
    st      20,[a + 1]

mov     a, result
    rts
```

FIG.3c

```
exampleMessage2: aChar
    [s]
    s : = String with: aChar.
    ^s hash
```

FIG.4a

```
exampleMessage2:
    ⋮ push    String
    push    with:
    push    aChar
    call    lookup
    mov     result, s
    push    s
    push    hash call    lookup mov     result, result
    rts
```

FIG.4b

```
exampleMessage2:
    ⋮ push    String
    push    aChar
    call    StringClass.with:

mov     result, s
    cmp     s@class, ByteString
    jeq     L1
    push    s
    call    TwoByteString.hash
    jmp     L2
L1:
    push    s
    call    ByteString.hash
L2:
    move    result, result
    rts
```

FIG.4c exampleMessage3: aChar<Character>

^aChar hash

FIG.5a

```
exampleMessage4:
    :

push   aChar
    push   hash
    call   lookup mov    result, result
    rts
```

FIG.5b

```
exampleMessage4:
    :

cmp    aChar@class, Character
    jeq    L1
    push   aChar
    push   hash
    call   lookup
    jmp    L2
L1:
    push   aChar
    call   Character.hash
L2:
    mov    result, result
    rts
```

FIG.5c

```
exampleMessage
    :
  ^anObject message
```

FIG.8a
PRIOR ART

```
exampleMessage:
    :
  push  anObject
  push  message
  call  lookup
  mov   result,result
  rts
```

FIG.8b
PRIOR ART 5,579,518

MESSAGE COMPILER FOR OBJECT-ORIENTED LANGUAGE THAT STATICALLY PRODUCES OBJECT CODE BY PROVISIONALLY IDENTIFYING A SET OF CANDIDATE TYPES

This is a Continuation of application Ser. No. 08/208,514 filed Mar. 10, 1994, now abandoned.

FIELD OF THE INVENTION

The present invention relates to a message compiler for an object-oriented language, such as Smalltalk, which has dynamically determined object types, that is classes, and which compiles source code relating to a message transmission portion into object code. The present invention especially relates to the structure of a compiler which produces object code of high execution speed.

BACKGROUND OF THE INVENTION

Of object-oriented programming languages, the above described Smalltalk, Objective-C and some other languages determine object types (classes) dynamically, that is, when executing a program.

Generally, with such a processing mechanism, whose processing concept is as shown in FIG. 6, the source code SC of a program is first compiled into object code OC by an compiler 1, and the compiled object code OC is read and executed by an interpreter 2.

With such an object-oriented language in which types are determined dynamically, if a message is transmitted to an object asking it to do some corresponding to the message is present in the class to which the object belongs. If the corresponding method is present, the requested processing is executed by the interpreter 2 immediately, and if not, the same search is repeated in turn in the parent classes, the superclasses, and the processing is finally executed where the method is found. To transmit a message to an object thus is generally called message transmission. FIG. 7 shows the concept of message transmission for an object-oriented language and the mechanism of method-search executed by the interpreter 2, based on the transmitted message.

As shown in FIG. 7, if an object 'anObject' Obj1 belongs to a class 'Class1' C1, which is derived from its parent class 'Class2' C2 and further the class 'Class2' C2 has a class 'ClassN' Cn as an ancestor (Here, if 'ClassN' Cn is the immediate parent of 'Class2' C2, the 'Class2' C2 is the child class and the 'Class1' C1 is the grandchild class of the class 'ClassN' Cn. ), and if a message is transmitted to the object 'anObject' Obj1, the interpreter 2 searches whether or not a method corresponding to the message is present in the predefined function table Tcl for the class 'Class1' C1 to which the object 'anObject' Obj1 receiving the message belongs. If a method corresponding to the message 'message' is present in the function table Tcl of the class 'Class1' C1, the interpreter executes the method, and if not, the method corresponding to the message 'message' present. Thus, a search for the method is carried out by the interpreter 2 until the corresponding method is finally found and then the method is executed.

FIG. 8 shows an example of the above described source code SC and the object code OC, which is the result of compilation. FIG. 8 (a) shows an example segment of program for message transmission in Smalltalk, an example of an object-oriented system in which type is determined dynamically. The object code OC shown in FIG. 8 (b) is an example of the output from the compiler 1. In FIG. 8 (b), the actual object code (machine code) is shown by a nnemonic expression for convenience.

In the method 'exampleMessage' shown in FIG. 8 (a), the source code '^anObject message' including a message to be transmitted to the object 'anObject' is compiled into the following object code OC including steps.

1. Push the name of the object 'anObject' and the message 'message' onto the stack.

2. Call a special processing routine 'lookup' for finding the method and copy the execution result 'result' to the result 'result', as indicated by the Return the value in 'result' as the result of the method 'exampleMessage' (as indicated by 'rts' in FIG. 8 (b).

The compiled object code OC is then read and executed by the interpreter 2.

The calling mechanism wherein a method is searched when a program is executed and the type thereof is determined dynamically is generally called calling with dynamic binding (or calling with late binding). It is necessary and useful in realizing polymorphism wherein different types respond to the same message differently, but compared with calling with static binding (or calling with early binding), wherein the type is determined statically by the preparatory type-checking at compile time, the execution speed with calling with dynamic binding is low. If the priority of a program is execution speed, the burden of calling with dynamic binding at execution time is a significant problem.

As shown, for example, in the invention called 'Message processing method in an object-oriented database control system' of Japanese unexamined patent publication No. Hei 2-231638 (1990), there are mechanisms wherein message processing speed is increased by combining calling with dynamic binding and calling with static binding, but they are intended for object-oriented languages such as Smalltalk which are dynamically type-determining and wherein the compiler itself is structured to increase the execution speed of the object code compiled from source code relating to a message transmission portion.

SUMMARY OF THE INVENTION

It is an object of the present invention to provide a message compiler for an object-oriented language free of the defects found in the conventional art.

It is another object of the present invention to provide a message compiler intended for an object-oriented language wherein types are determined dynamically.

It is a further object of the present invention to provide a message compiler for an object-oriented language capable of compiling source code relating to a message transmission portion into object code which is more excellent in execution speed.

Additional objects and advantages of the invention will be set forth in part in the description which follows and in part will be apparent to a person with ordinary skill in the art from the description, or The message compiler for an object-oriented language according to the present invention, in which types are determined dynamically, comprises:

source code parsing means for parsing the source code;

provisional type identifying means for provisionally identifying the candidate type of an object to which the message included in the source code is transmitted, based on the parsed result of the source code by the source code parsing means;

method-searching means for searching the method corresponding to the candidate for the type provisionally identified by the provisional type identifying means;

type-checking code producing means for producing object code to check the candidate for the type provisionally identified, if the number of the candidate for the type is more than one;

static call producing means for producing, based on the method searched by the searching means, object code for a statically bound call, if the number of the candidates for the type is one or the candidate for the type is determined to be right by the checking of the candidate for the type; and dynamic call producing means for producing object code for a dynamically bound call, if the provisional type identification cannot be carried out or said candidate for the type is determined to be wrong by the checking of the candidate for the type.

The above described provisional type identifying means for provisionally identifies the candidate type to which the object to which the parsed message is transmitted belongs, based on the nature of the source code and the syntax particular to the object-oriented language, and as a result, one of the following three provisional identifications is drawn.

1. The number of candidates for the type is one.
2. More than one, that is, a plurality of types can be identified provisionally as candidates.
3. No candidate type can be identified, that is, no provisional type identification can be made.

If the number of the candidates for the type is one, that is, calling with static binding is possible at compile time, a method corresponding to the message and present in the identified type is retrieved by the method-searching means, and further, static calls directly calling the retrieved method are produced by the static call producing means.

If more than one, that is, a plurality of candidate types can be identified provisionally, it is possible to carry out type-checking such as a condition-comparison with respect to the provisionally identified types, and if one of them matches the required condition, it may be possible to call it statically. If this is possible, the type-checking code producing means produces object code to perform the type-checking at execution time, and with respect to the one or a plurality of types considered to match the condition, that is, to be right, methods corresponding to the message and present in the types are searched by the method-searching means as described above, and static call directly calling the searched methods are produced by the static call producing means. As for the types provisionally identified but determined not to match the condition, that is, to be wrong as a result of the type-checking, dynamic calls dynamically calling methods in accordance with the above described method-search mechanism are produced by the dynamic call producing means.

If no candidate type can be identified, that is, no provisional type identification can be made, calling with static binding at compile time is impossible, and dynamic calls which dynamically call methods are produced in accordance with the method-search mechanism The structure of the compiler does not allow all the calls to use static binding because of the language specification of the object-oriented language itself, but in many cases, it can produce object code of high execution speed as static calls or increase the possibility with which the produced object code is Additional objects and advantages of the invention will be set forth in the following description and will be apparent to a person of ordinary skill in the art executed as static calls.

BRIEF DESCRIPTION OF THE DRAWINGS

The manner by which the above objects and the other objects, features and advantages of the preset invention are attained will be fully evident from the following detailed description when it is considered in light of the accompanying drawings, wherein:

FIG. 3 (*a*) to (*c*) are abbreviated figures showing an example of compilation by the embodiment of the compiler, in the case that the number of the candidates for the type is one. FIG. 3 (*a*) is an example of source code, (*b*) is an example of object code produced by the conventional compiler and (*c*) is an FIG. 4 (*a*) to (*c*) are abbreviated figures showing an example of compilation by the embodiment of the compiler, in the case that more than one but not more than a specified number of types can be identified. FIG. 4 (*a*) example of source code, (*b*) is an example of object code produced by the conventional compiler and (*c*) is an example of object code produced by the compiler of the present embodiment.

FIG. 5 (*a*) to (*b*) are abbreviated figures showing an example of compilation by the embodiment of the compiler, in the case that a type-determining hint is provided. FIG. 5 (*a*) example of source code, (*b*) is an example of object code produced by the conventional compiler and (*c*) is an example of object code produced by the compiler of the present embodiment.

FIG. 8 comprising FIGS. 8(*a*) and 8(*b*) is an abbreviated view of a compilation example of the conventional message compiler with respect to a portion of an object-oriented language

DETAILED DESCRIPTION OF THE INVENTION

EMBODIMENT

Figure 1:
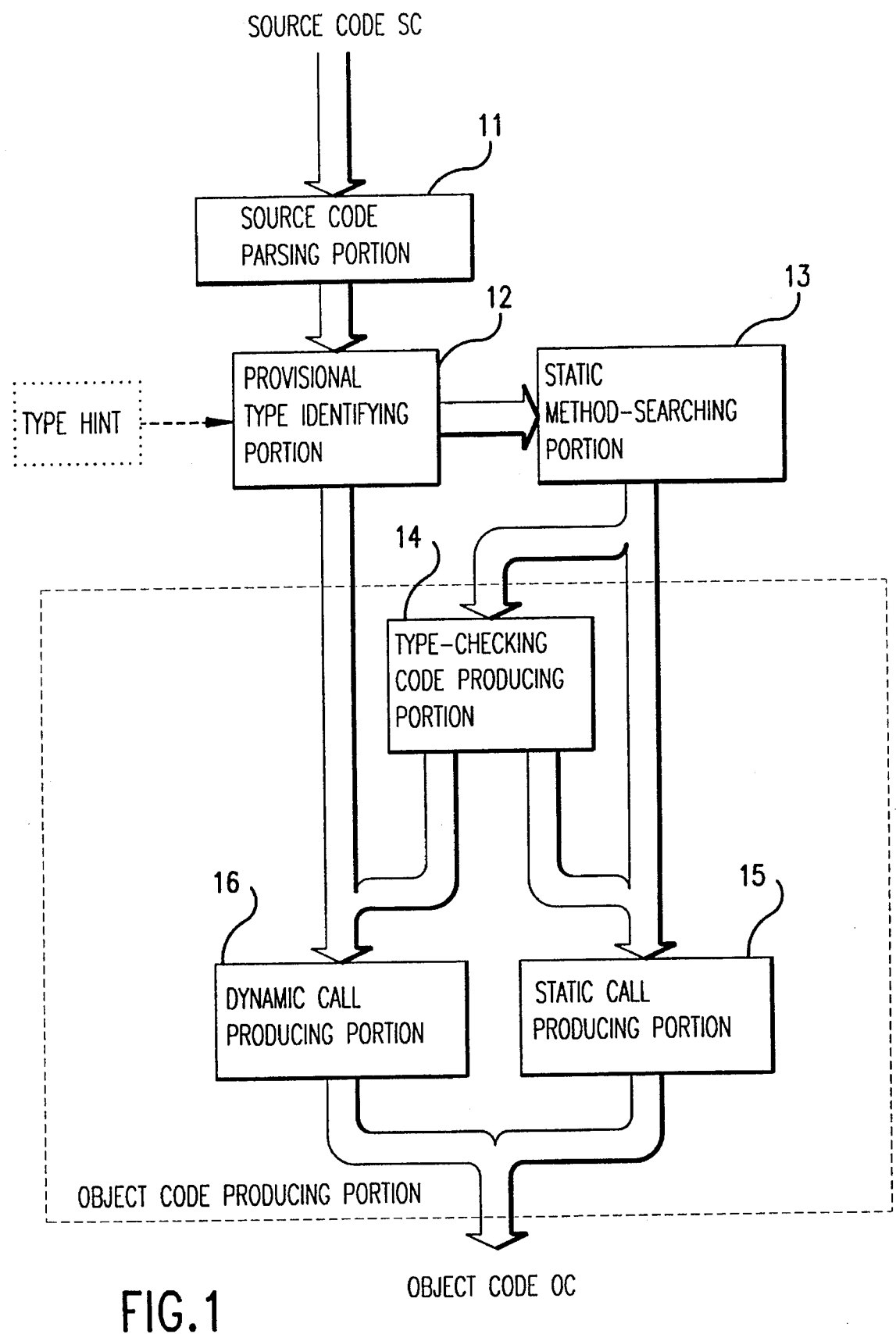
FIG. 1 hows an embodiment of a message compiler for an object-oriented language according to the present invention.

FIG. 1 shows the structure of an embodiment of the message compiler for an object-oriented language according to the present invention.

Figure 6:
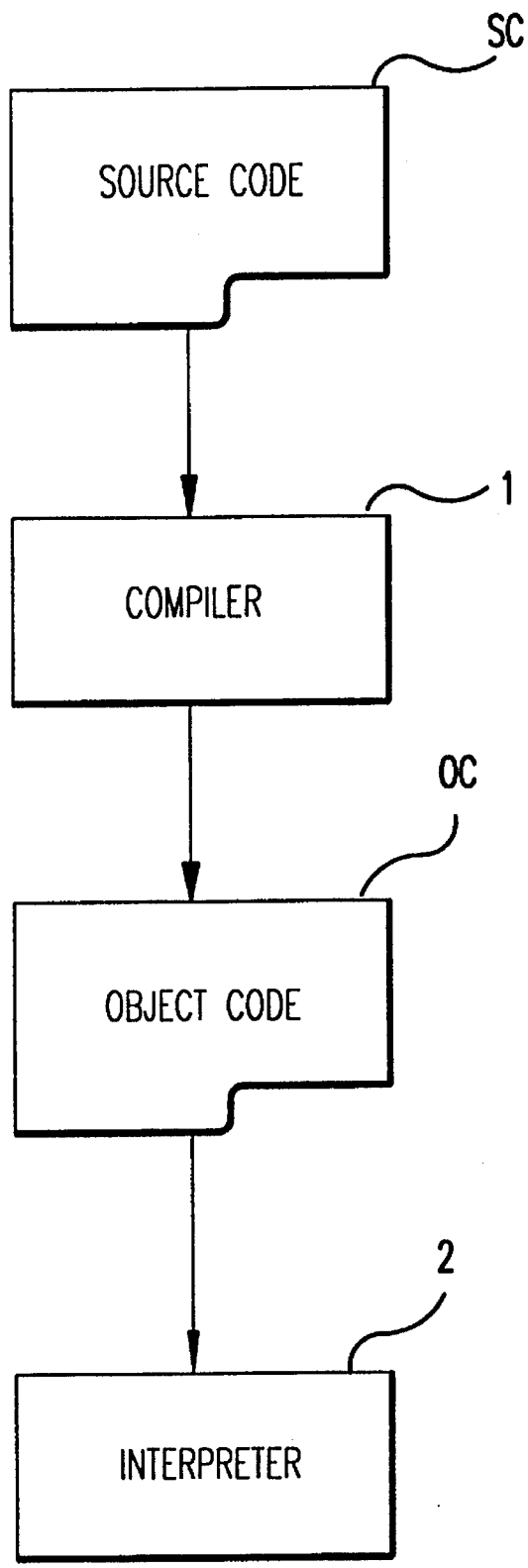
FIG. 6 shows a general example of the processing concept of an object-oriented language wherein type is determined dynamically.

Here, the concept of the whole system is the same as shown in FIG. 6, that is, the source code SC of the program is first compiled into object code OC by the compiler, and the compiled object code OC is read and executed by the interpreter.

As shown in FIG. 1, the compiler of the present embodiment comprises:

a source code parsing portion 11 which parses the source code SC being input;

a provisional type identifying portion 12 which provisionally identifies the type, that is, the class of the object to which the message included in the source code is transmitted, in accordance with the result of the source code parsing performed by the source code parsing portion 11;

a static method-searching portion 13 which statically, that is at compile time, searches the method corresponding to the type identified provisionally;

a type-checking code producing portion 14 which produces, if the number of the candidates for the type identified by the the provisional type identifying portion 12 is more than one, the object code to perform type-checking such as a condition-comparison with respect to the candidate types provisionally identified at execution time;

a static call producing portion 15 which produces, if the number of the candidates for the type identified by the provisional type identification performed by the provisional type identifying portion 12 is one or if the provisional type identification is determined to be right by the type-checking, the object code for a statically bound call in accordance with the method searched by the static method-searching portion 13; and a dynamic call producing portion 16 which produces, if the candidate type cannot be identified provisionally by the provisional type identification performed by the provisional type identifying portion 12 or the provisionally identified candidate type is determined to be wrong by the type-checking, the object code for a dynamically bound call. even if the type cannot be provisionally identified from the source code, if the name of a type is provided in the source code in a specified formula as a type-determining hint by the programmer, the name of the type provided is output together with the candidate type provisionally identified, then as a result, at least a specific type is identified provisionally, and the type-checking code producing portion 14 is started. If the type hint is determined to be right by the type-checking, the object code for a statically bound call is produced by the static call producing portion 15 as described above.

Figure 2:
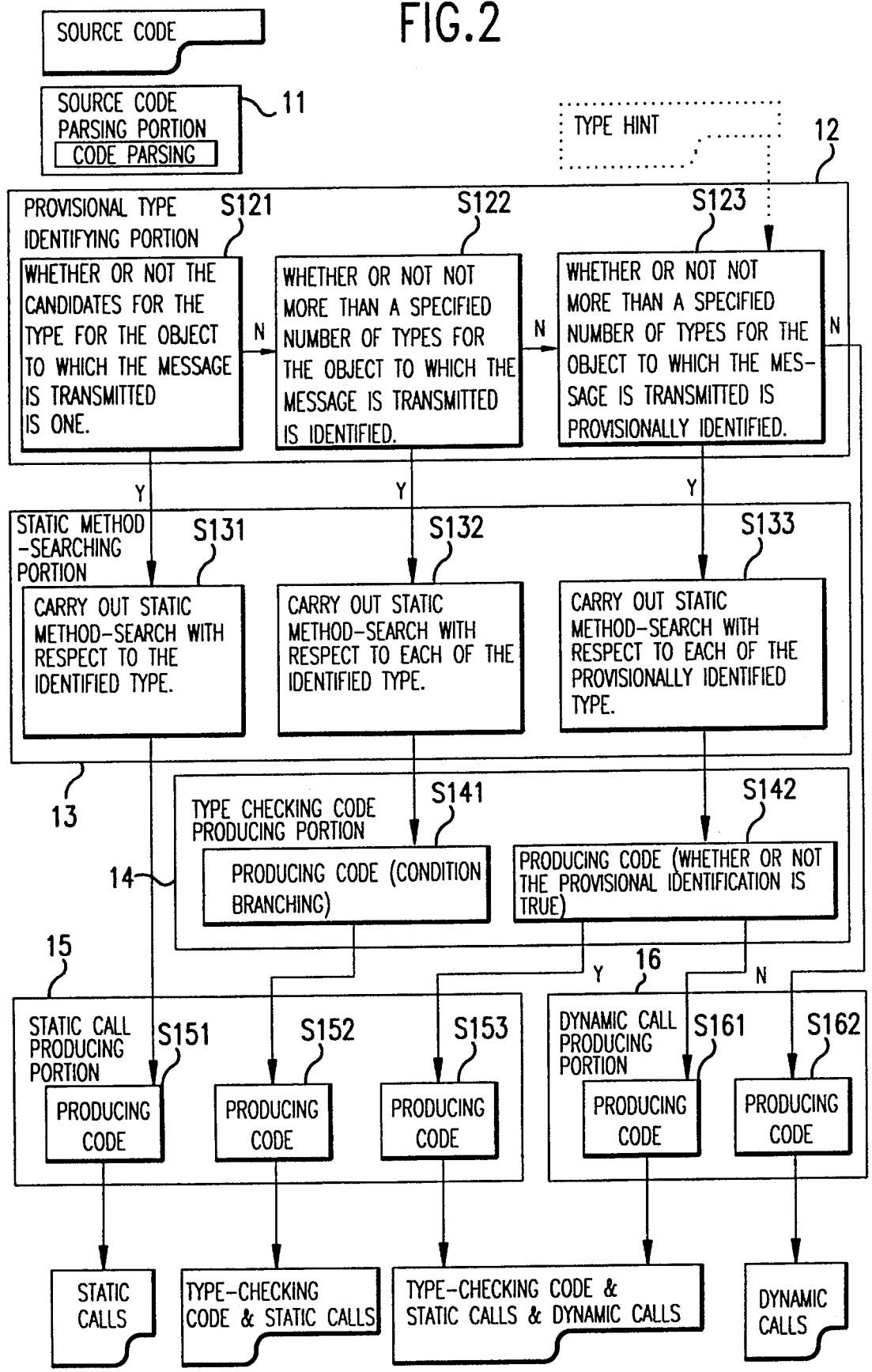
FIG. 2 shows the functions of the compiler shown in FIG. 1 and the corresponding compilation steps.

FIG. 2 shows functions of each portion in detail and the compilation steps of the compiler described in the embodiment above, and the behavior of the compiler is now described in detail referring to FIG. 2.

The source code parsing portion 11 parses the source code SC being input, by which the statements in the source code SC are parsed and it is identified what message is transmitted to which object, and thus parsing results are provided to the provisional type identifying portion 12.

The provisional type identifying portion 12 provisionally identifies the candidate for the type of the object to which the parsed message is transmitted, based on the nature of the source code and the syntax beginning with a capital letter such as 'Array' is a global variable, which generally shows the name of the class, and again, that if a message 'with' is transmitted to an object named 'String', the class to which the object belongs is either 'ByteString' (that is, a string of one-byte characters), or 'TwoByteString' (that is, a string of two-byte characters). The above described provisional type identification is carried out in accordance with such knowledge, and here the following four results are possible.

Result 1 The number of the candidates for the type is one (as shown by S121 in the figure).

Result 2 More than one but not more than a specified number of types can be identified as candidates (as shown by S122 in the figure).

Result 3 Although it is not possible to identify a group of not more than the specified number of types, nonetheless provisional identification of the type to which the object belongs is possible (as shown by S123 in the figure).

Result 4 No provisional identification can be made (as shown by S123 in the figure).

The provisionally identified candidate types added based on the type-determining hints are output as to 3 are provided to the static method-searching portion 13 and Result 4 is provided to the dynamic call producing portion 16.

As described above referring to FIG. 7, the static method-searching portion 13 carries out method-search when compiling the source code, that is, if the number of the candidates for the type is one (as shown by S121 in the figure) in accordance with the provisionally identified result performed by the the provisional type identifying portion 12, the method corresponding to the message is searched from the function table for the specified type and is provided to the static call producing portion 15 (as shown by S131 in the figure). If more than one but not more than a specified number of types can be identified (as shown by S122 in the figure), the methods corresponding to the message are searched from the function tables of each of the specified types and are provided to the type-checking code producing portion 14 (as shown by S132 in the figure). If although it is not possible to identify a group of not more than the specified number of types, nonetheless provisional identification of the type to which the object belongs is possible (as shown by S123 in the figure), methods corresponding to the message are searched from the function tables of each of these provisionally identified candidate types and are provided to the type-checking code producing portion 14

The size of thus searched methods is also checked in the static method-searching portion 13, and if it is smaller than a specified size, the searched methods are in-line expanded and the in-line expanded result is provided to the static call producing portion 15 or the type-checking code producing portion 14.

If the number of is the candidates for the type one as the provisionally in identified result of as Result 1 above, that is, is calling with static binding is possible at compile time, the method corresponding to the message and present in the specified type is searched by the method-searching portion 13, and static calls which directly call the searched method are produced by the static call producing portion 15 (as shown by S151.)

If more than one, that is, a plurality of candidate types can be identified or provisionally identified as Results 2 or 3 above, that is, type-checking such as a condition-comparison with respect to the provisionally identified candidate is carried out, and if one of them matches the required condition, it may be possible to call it statically. At least, if a number of candidate types can be identified definitely, it is possible to compile conditional branches which perform type checks for these types, and to compile statically bound calls for the types to be When this is the case, the type-checking code producing portion 14 produces object code to perform the type-checking at execution time.

If some candidates types can be identified as the provisionally identified Result 2 above, just performing type-checking such as conditional branching allows methods included in each of the branches to be called statically, and in such a case, in the type-checking code producing portion 14, conditional branching type-checking code is produced and is provided to the static call producing portion 15 (as shown by S141.) In the static call producing portion 15, static calls produced to call directly the method searched by the static method-searching portion 13 are added to the object code thus produced as the type-checking code and the object code is output (as shown by S152)

If some types can be provisionally identified but it is not clear whether or not they can be called statically as in Result 3 above, the type-checking code producing portion 15 produces type-checking code to identify either static or dynamic calls at execution time (as shown by S142). The static call producing portion 15 produces static calls for the case when the type-checking matches, based on the methods searched by the static method-searching portion 13 (as shown by S153), and the dynamic call producing portion 16 containing a combination of type-checking code, static calls and dynamic calls is output from the compiler.

On the other hand, if no type can be identified, that is, no provisional type identification can be made as the provisionally identified Result 4 above, calling with static binding at compile time is impossible, and dynamic calls which dynamically call methods are produced in accordance with the method-search mechanism by the dynamic call producing portion 16, as in the conventional manner (as shown by S162.)

The compiler according to the present embodiment does not allow all the calls to use static binding because of the language specification of the object-oriented language, but in many cases, it can produce object code of high execution speed as static calls or increase the possibility with which the object code produced as static calls is executed.

FIGS. 3 to 5 show, just for reference, compilation examples using the compiler of the present embodiment, wherein the above described Smalltalk is employed as the object-oriented system. In each of FIG. 3 to 5, (a) is an example of source code, (b) is an example of object code produced by the conventional compiler, and (c) is an example of object code produced by the compiler of the present embodiment. In (b) and (c) of each figure, actual object code (machine code) is FIG. 3 shows a compilation example, wherein the number of the candidates for the type identified as a result of the provisional type identification performed by the provisional type identifying portion 12 is one.

In the source code shown in FIG. 3 (a), 'exampleMessage' is the name of a method, and 'a' is a variable. The 'a:=Array new : 5' here, is a command to transmit a message 'new :' whose message argument is '5' to an object 'Array' and to substitute the result for the variable 'a'. The 'a at :1 put :20' provided in the next line shows a command to transmit a message 'at :put :' whose message arguments are '1' and '20' to an object 'a'. The ^ provided in the last line shows a command to return the value of 'a' obtained by the processing. Here, a specific type for 'Array' is identified in the portion of 'Array new :5' relating to message transmission, and a specific type for 'a' is also identified in the portion of 'a at :1 put :20' relating to message transmission.

Figure 7:
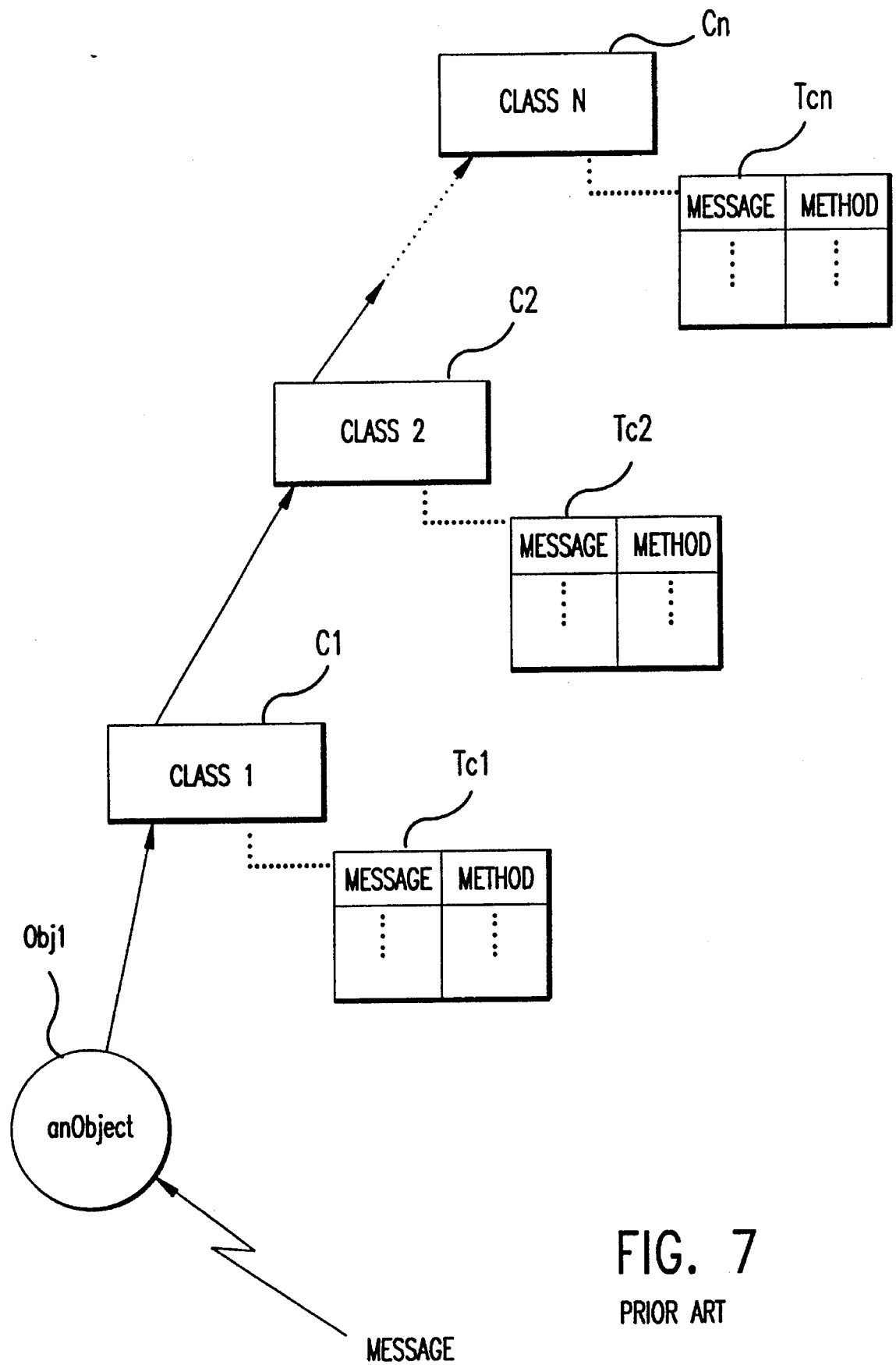
FIG. 7 is an abbreviated view showing a concept of message transmission and method-search mechanism of an object-oriented language.

With respect to such source code, conventionally, as shown in FIG. 3 (b), after pushing each of 'Array', 'new :' and '5' onto the stack for the object 'Array', the routine 'lookup' to execute method-search dynamically is called. The same manner can be applied to the object 'a', and after pushing each of search mechanism performed by the method-search routine 'lookup' is as shown in FIG. 7.

On the other hand, the compiler according to the above described embodiment produces object code as shown in FIG. 3 (c).

As the structure of Smalltalk allows, as described above, 'ArrayClass' which is the class of 'Array' to be identified in the portion such as 'Array new :5' of the source code relating to message transmission and it also allows 'Array' which is the class of 'a' to be identified in the portion such as 'a at :1 put :20' transmission (as shown by S121 of FIG. 2 ), each of a method 'ArrayClass. new:' present in the function table of the class 'ArrayClass' and corresponding to the message 'new:' and a method 'Array. at:put :' present in the function table of the class 'Array' and corresponding to the message 'at:put:' is searched by the static method-search performed by the static method-searching portion 13 (as shown by S131 of FIG. 2), and static calls which call them statically, (push Array), (push 5), (call ArrayClass. new:) and (push a), (push 1), (push 20) and (call Array. at:put :) are produced by the static call producing portion 15 (as shown by S151 of FIG. 2 ). In the example shown in FIG. 3 (c), the method 'Array. at:put :' is considered to be smaller than a specified size as a result of size-(st 20, [a+1]), which is made by in-line expansion of the method and directly showing the command to store 20 in element 1 of the array a is produced. The in-line expansion is made by further developing the static calls, and the execution speed thereof is higher than that of the static calls. Its object code, however, is generally longer than that of the static calls, so in the above described embodiment, the size of the method is checked, and only if it is shorter than a specified size, it is in-line expanded.

As a method-search routine 'lookup' is not called here as shown in FIG. 3, the execution speed thereof is improved at least by a corresponding amount.

FIG. 4 shows a compilation example in the case that more than one but not more than a specified number of types can be identified by the provisional type identification by the provisional type identifying portion 12.

In the source code of FIG. 4 (a), 'exampleMessage2' is the name of the method and 's' is a variable. In the present example, 's:=String with :aChar' shows a command to transmit a message 'with :' whose message argument is 'aChar' to an object 'String' and to substitute the result for the variable 's'. The '^ s hash' provided in the next line shows a command to return the value of the result obtained by transmitting transmission. Whether the class to which the object 's' belongs is either 'ByteString' (that is, a string of one-byte characters) or 'TwoByteString' (that is, a string of two-byte characters) is also determined in the portion of 's hash' relating to message transmission.

With respect to such source code, conventionally, as shown in FIG. 4 (b), a method-search routine 'lookup' for a dynamically bound call is also called for any as in of these objects the example described above.

In such a case, however, the compiler of the above described embodiment produces the object code as shown in FIG. 4 (c).

As a specific type 'StringClass' can be identified for the object 'String' in the portion of 'String with :aChar' of the source code relating to message transmission (as shown by S121 of FIG. 2), a method 'StringClass. with:' present in the function table of the class 'StringClass' and corresponding to the message 'with:' searched by the method-search performed by the static method-searching portion 13 (as shown by S131 of FIG. 2) and the static calls which call them statically, (push String), (push aChar) and (call StringClass. with :) are produced by the static call producing portion 15 as described above (as shown by According to the class structure of Smalltalk, as described above, it is known that if a message 'with:' is transmitted to the object 'String', an object which belongs to a class of either 'ByteString' (that is, a string of one-byte characters) or 'TwoByteString' (that is, a string of two-byte characters) is returned as a result. As the value of the message argument 'aChar' is not clear at compile time, for the latter half of the source code, these two classes of 'ByteString' and 'TwoByteString' are identified by the provisional type identifying portion 12 as the candidates (as shown by S122 of FIG. 2).

The static method-searching portion 13 searches the methods 'ByteString. hash' and 'TwoByteString. hash' which are present in the function tables of these classes of 'ByteString' and 'TwoByteString' and each of which corresponds to the message 'hash'. After that, it passes these methods to the type-checking code producing portion 14 (as shown by S132 of FIG. 2).

Following this behavior, the type-checking code producing portion 14 produces the type-checking code,

```
cmp s@class, ByteString
jeq L1
...
L1:
...
``` which compares the value of the class 's@ class' of the object 's' obtained dynamically at execution time with the value of the class 'ByteString' and branches on this condition, and it passes the code to the static call producing portion 15 (as shown by S141 of FIG. 2). Here, 'jeq L1' shows a command to jump to the label 'L1' if the comparison is right.

As shown in FIG. 4 (c), the static call producing portion 15 produces and adds the static calls corresponding to the type-checking code, that is,

```
push s
call TwoByteString. hash, and
push s
call ByteString. hash
```

(as shown by Step 152 of FIG. 2) Here, the value of the class 's@ class' of the object 's' obtained dynamically at execution time is compared with the value of the class 'ByteString' and as a result, if the comparison is right, a method 'ByteString. hash' is called statically, The thoroughgoing addition of static calls improves the execution speed positively.

FIG. 5 shows a compilation example in the case that a 'type-determining hint' is provided.

In the source code of FIG. 5 (a), 'exampleMessage3' is the name of the method, <'Character>' is a type-determining hint provided by the programmer and showing that the class to which the message argument 'aChar' belongs is 'Character'. Here, "^ aChar hash' shows a command to transmit a message 'hash' to an object 'aChar' and to return the value.

Conventionally, as shown in FIG. 5 (b), a method-search routine 'lookup' for a dynamically bound call is called.

The compiler of the above described embodiment produces the object code shown in FIG. 5 (c).

In this case, the provisional type identifying portion 12, the class of 'aChar' cannot be identified and it is provisionally identified only by the type-determining hint (as shown by S123 of FIG. 2), and the method 'Character. hash' corresponding to the provisionally identified type 'Character' is searched by the static type-checking code producing portion 14 (as shown by S133 of FIG. 2), and whether or not the 'Character. hash' is actually used at execution time depends on the result of the type-checking code produced by the type-checking code producing portion 14.

Here, the type-checking code producing portion 14 produces the following type-checking code,

```
cmp aChar@class, Character
jeq L1
...
L1:
...
``` which compares the value of the class 'aChar@ class' of the object 'aChar' dynamically obtained at execution time with the value of the class 'Character' provided as the hint and branches accordingly (as shown by S142 of FIG. 2). The static call producing portion 15 produces the following object code

```
push aChar
call Character. hash
``` which statically calls the method 'Character. hash' searched by the static method-searching portion 13 providing for the case when the checked result is right (as shown by S153 of FIG. 2), and the dynamic call producing portion 16 produces the following object code

```
push aChar
push hash
call lookup
``` for a dynamic bound call as conventionally, providing for the case when the checked result is wrong, that is, if the 'type-determining hint' is wrong (as shown by S161 of FIG. 2). As described above, 'jeq L1' of the type-checking code indicates a command to jump to the label 'L1' if the comparison is right.

Each of the object code produced as shown in FIG. 5 (c) is thus executed as follows:

1. Compare the value of the class 'aChar@ class' to which the object 'aChar' obtained dynamically belongs with the value of the class 'Character' provided as the hint.
2. Call 'Character. hash' just as provisionally identified by the type-determining hint and execute it, if the comparison is right (true).
3. Execute dynamic calls using the dynamic method-search routine 'lookup' as conventionally, if the comparison is wrong (false), that is, the type-determining hint is wrong.

Not all the calls can be achieved statically as in the example shown in FIG. 5, but by producing and preparing as many static calls as possible, the rate with which high speed processing performed by the static calls is executed is increased.

It is possible to provide not only one but a plurality of types as the type-determining hint, by which the rate with which the program is executed by the static calls is further increased.

What is claimed is:

1. A data processing system including a message compiler, for an object-oriented language with which object types are determined during execution of a programming code, said compiler compiling source code relating to a message into object code, the message compiler comprising:

source code parsing means for receiving said source code and for parsing said source code to identify at least one message containing said source code to be transmitted to a corresponding object;

provisional type identifying means for identifying a set of candidate types for said corresponding object to which said at least one message is to be transmitted, based on a parsed result of said source code by said source code parsing means;

static method-searching means for statically providing a method corresponding to each candidate type within said set of candidate types when said set of candidate types includes at least one candidate type;

type-checking code producing means for producing object code at compile time to perform a type-check with each candidate type within said set of candidate types and said corresponding method, if said set of candidate types includes more than one candidate type;

static call producing means for producing object code for a statically bound call based on said corresponding method statically provided by said static method-searching means if said set of candidate types includes only one correct type, and for producing object code for a statically bound call based on said corresponding method for a type-checked correct type for each candidate type within said set of candidate types; and dynamic call producing means for producing object code for a dynamically bound call, which will determine a type at execution time for the type that is unknown at compile time, if the provisional type identifying means identifies an empty set for said set of candidate types and if each candidate type within said set of candidate types is a type-checked incorrect type, wherein a first probability that said compiled object code from said source code is executed by said statically bound call during execution of said compiled object code is increased relative to a second probability that said compiled object code is executed by said dynamically bound call during execution of said compiled object code.

2. A data processing system including a message compiler, for an object-oriented language with which object types are determined during execution of a programming code, said compiler compiling source code relating to a message into object code, the message compiler comprising:

source code parsing means for receiving said source code and for parsing said source code to identify at least one message containing said source code to be transmitted to a corresponding object;

provisional type identifying means for identifying a set of candidate types for said corresponding object to which said at least one message is to be transmitted, based on a parsed result of said source code by said source code parsing means;

static method-searching means for statically providing a method corresponding to each candidate type within said set of candidate types when said set of candidate types includes at least one candidate type, wherein a size of a method searching portion is checked by said static method-searching means, wherein said method corresponding to said each candidate type is provided only if said size of said method portion is less than a predetermined size;

type-checking code producing means for producing object code at compile time to perform a type-check with each candidate type within said set of candidate types and said corresponding method, if said set of candidate types includes more than one candidate type;

static call producing means for producing object code for a statically bound call based on said corresponding method statically provided by said static method-searching means if said set of candidate types includes only one correct type, and for producing object code for a statically bound call based on said corresponding method for a type-checked correct type for each candidate type within said set of candidate types; and dynamic call producing means for producing object code for a dynamically bound call, which will determine a type at execution time for the type that is unknown at compile time, if the provisional type identifying means identifies an empty set for said set of candidate types and if each candidate type within said set of candidate types is a type-checked incorrect type.

3. The system according to claim 1, wherein the object code is produced at compile time to perform a type-check with said each candidate type within said set of candidate types and said corresponding method by said type-checking code producing means if said set of candidate types is less than a preset number and even when said set of candidate types is greater than said preset number if an operator limitation is provided to said provisional type identifying means.

\* \* \* \* \*